US012743246B2

(12) United States Patent
Moon

(10) Patent No.: US 12,743,246 B2
(45) Date of Patent: Sep. 22, 2026

(54) ELECTRONIC APPARATUS FOR OUTPUTTING AUDIO FROM MULTIPLE SOURCES AND CONTROL METHOD THEREOF

(71) Applicant: SAMSUNG ELECTRONICS CO., LTD., Suwon-si (KR)

(72) Inventor: Younghoon Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 18/381,018

(22) Filed: Oct. 17, 2023

(65) Prior Publication Data

US 2024/0103798 A1 Mar. 28, 2024

Related U.S. Application Data

(63) Continuation of application No. PCT/KR2023/014803, filed on Sep. 26, 2023.

(30) Foreign Application Priority Data

Sep. 26, 2022 (KR) ........................ 10-2022-0121512

(51) Int. Cl.
*G06F 3/16* (2006.01)

(52) U.S. Cl.
CPC .............. *G06F 3/165* (2013.01); *G06F 3/162* (2013.01)

(58) Field of Classification Search
CPC ................................. G06F 3/165; G06F 3/162
See application file for complete search history.

(56) References Cited

U.S. PATENT DOCUMENTS 8,545,306 B2 10/2013 Ogata et al.
9,233,301 B2 1/2016 Igoe
(Continued)

FOREIGN PATENT DOCUMENTS

CN 111641753 A 9/2020
CN 113573172 A * 10/2021 .............. H04Q 9/00
(Continued)

OTHER PUBLICATIONS

Extended European Search Report dated Jun. 30, 2025, issued by the European Patent Office in European Application No. 23873096.4.

(Continued)

*Primary Examiner* — Joseph Saunders, Jr.
(74) *Attorney, Agent, or Firm* — Sughrue Mion, PLLC

(57) ABSTRACT

An electronic apparatus is disclosed. The electronic apparatus includes a communication interface and a processor configured to control, based on a signal corresponding to a play start of a first audio being received from a first device through the communication interface, to output the first audio received from the first device, end, based on a signal corresponding to a play start of a second audio being received from a second device through the communication interface while the first audio is being output, an output of the first audio and control to output the second audio received from the second device, transmit, based on an output of the second audio being ended, a signal requesting playing of the first audio to the first device through the communication interface, and control, based on the signal corresponding to the play start of the first audio corresponding to the signal requesting the playing of the first audio being received, to output the first audio received from the first device.

15 Claims, 11 Drawing Sheets

(56) References Cited

U.S. PATENT DOCUMENTS

| | | | | |
|---|---|---|---|---|
| 9,288,810 | B2 | 3/2016 | Karunakaran | |
| 9,467,674 | B2 | 10/2016 | Parambil et al. | |
| 10,205,762 | B2 | 2/2019 | Leung | |
| 10,514,884 | B2 | 12/2019 | Mathur | |
| 11,350,200 | B2 | 5/2022 | Ha et al. | |
| 11,579,836 | B2 | 2/2023 | Kim et al. | |
| 2001/0055475 | A1 | 12/2001 | Ogata et al. | |
| 2009/0006695 | A1* | 1/2009 | Bushell | G06F 9/5038 710/262 |
| 2011/0164763 | A1 | 7/2011 | Ogata et al. | |
| 2012/0029672 | A1* | 2/2012 | Hamilton | G11B 27/30 700/94 |
| 2013/0317635 | A1* | 11/2013 | Bates | G06F 3/0482 700/94 |
| 2014/0193133 | A1 | 7/2014 | Parambil et al. | |
| 2016/0139873 | A1 | 5/2016 | Bates et al. | |
| 2018/0088897 | A1 | 3/2018 | Mathur | |
| 2021/0255823 | A1 | 8/2021 | Kim et al. | |
| 2021/0377663 | A1 | 12/2021 | Carrigan et al. | |
| 2023/0215460 | A1* | 7/2023 | Shiloh Perl | G10L 25/51 704/200 |
| 2023/0325145 | A1* | 10/2023 | Ni | G06F 21/84 700/94 |

FOREIGN PATENT DOCUMENTS

| | | | | |
|---|---|---|---|---|
| KR | 10-2002-0000727 | A | 1/2002 | |
| KR | 10-2014-0090033 | A | 7/2014 | |
| KR | 10-2017-0139534 | A | 12/2017 | |
| KR | 10-2021-0105785 | A | 8/2021 | |
| WO | 2015/200556 | A2 | 12/2015 | |
| WO | WO-2022052756 | A1 * | 3/2022 | G06F 21/32 |
| WO | 2022/193839 | A1 | 9/2022 | |

OTHER PUBLICATIONS

International Search Report (PCT/ISA/210) issued Jan. 17, 2024 by the International Searching Authority in International Patent Application No. PCT/KR2023/014803.

Written Opinion (PCT/ISA/237) issued Jan. 17, 2024 by the International Searching Authority in International Patent Application No. PCT/KR2023/014803.

* cited by examiner

ELECTRONIC APPARATUS FOR OUTPUTTING AUDIO FROM MULTIPLE SOURCES AND CONTROL METHOD THEREOF

CROSS-REFERENCE TO RELATED APPLICATIONS

This application is a by-pass continuation of an International Application No. PCT/KR2023/014803, filed on Sep. 26, 2023, which is based on and claims priority to Korean Patent Application No. 10-2022-0121512, filed on Sep. 26, 2022, the disclosures of which are incorporated herein by reference in their entireties.

BACKGROUND

1. Field

The disclosure relates to an electronic apparatus outputting audio and a control method thereof. More particularly, the disclosure relates to an electronic apparatus that outputs audio based on data received from a plurality of devices and a control method thereof.

2. Description of Related Art

Electronic devices of various types are being developed and supplied with developments in electronic technology. Specifically, audio sink devices such as a Bluetooth speaker or a Bluetooth headset that output audio by performing communication with user terminal devices and the like are being developed, and the supply thereof expanded.

When audio source devices (e.g., smartphones, televisions (TV), etc.) and audio sink devices perform communication through communication functions of Bluetooth, Wireless fidelity (Wi-Fi), and the like, an audio sink device may receive an audio signal from an audio source device, and output audio that corresponds to the received audio signal.

However, if a plurality of audio source devices perform communication with a single audio sink device, there is a need for a method to process the received data so as to enhance user usability when audios are simultaneously received from the plurality of audio sources, respectively.

SUMMARY

According to an aspect of the disclosure, an electronic apparatus include: a communication interface; and at least one processor configured to: based on first audio data and a first play start signal corresponding to the first audio data being received from a first device through the communication interface, cause the first audio data to be output, based on second audio data and a second play start signal corresponding to the second audio data being received from a second device through the communication interface while the first audio data is being output, cause the output of the first audio data to stop and cause the second audio data to be output, based on the output of the second audio data ending, transmit a signal requesting playing of the first audio data to the first device through the communication interface, and based on the first play start signal being received through the communication interface subsequent to the transmitting of the signal requesting playing of the first audio data, cause the first audio data to be output.

The at least one processor may be further configured to: based on a play stop signal corresponding to the second audio data being received from the second device through the communication interface within a first time from when the output of the second audio data is started, cause the output of the second audio data to stop.

The electronic apparatus may further include: at least one memory storing at least one from among history information corresponding to a device or audio duration time information corresponding to a plurality of application types, wherein the at least one processor may be further configured to: based on the play stop signal being received through the communication interface during the first time and based on at least one from among the history information or the audio duration time information, cause the output of the second audio data to stop and transmit the signal requesting the playing of the first audio data to the first device through the communication interface.

The at least one processor may be further configured to: identify, based on the second play start signal being received from the second device through the communication interface while the first audio data is being output, type information of an application from among the plurality of application types corresponding to the second audio data, and identify, based on the identified type information of the application and the audio duration time information, a duration of the first time.

The electronic apparatus may further include: a user interface, wherein the at least one processor is further configured to: identify, based on a user input received through the user interface, the duration of the first time.

The at least one processor may be further configured to: based on the second play start signal and the second audio data being received from the second device through the communication interface, identify whether the second audio data is an alarm type based on at least one from among the second audio data or history information corresponding to the second device, based on the second audio data being identified as the alarm type, identify whether the play stop signal is received from the second device through the communication interface during the first time, and based on identifying that the play stop signal was received during the first time, transmit the signal requesting the playing of the first audio data to the first device through the communication interface.

The electronic apparatus may further include: at least one memory storing a trained neural network model, wherein the at least one processor is further configured to: identify whether the second audio data is the alarm type by inputting the second audio data into the trained neural network model.

The at least one processor may be further configured to: based on receiving, through the communication interface, a signal corresponding to a same type as the second play start signal a number of times that is greater than or equal to a pre-set number of times during a second time interval from when the second play start signal is received from the second device, cause the output of the second audio data to stop.

The electronic apparatus may further include: an outputter, wherein the second audio data is an alarm type, and wherein the at least one processor is further configured to: based on the first play start signal being received from the first device through the communication interface, output the first audio data through the outputter, based on the second play start signal being received from the second device through the communication interface while the first audio data is being output, output the second audio data through the outputter, and based on the first play start signal being received through the communication interface in response to the signal requesting playing of the first audio, output the first audio data through the outputter.

The at least one processor may be further configured to: based on the first play start signal being received through the communication interface in response to the signal requesting playing of the first audio data, cause the first audio data to be output from a second play time point in the first audio data that precedes, by a pre-set time interval, a first play time point corresponding to a play time point in the first audio data when the output of the first audio data was stopped.

According to an aspect of the disclosure, a method of controlling an electronic apparatus includes: based on first audio data and a first play start signal corresponding to the first audio data being received from a first device, outputting the first audio data; based on second audio data and a second play start signal corresponding to the second audio data being received from a second device while the first audio data is being output, stopping the outputting of the first audio data and outputting the second audio data; based on the outputting of the second audio data ending, transmitting a signal requesting playing of the first audio data to the first device; and based on the first play start signal being received subsequent to the transmitting of the signal requesting the playing of the first audio data, outputting the first audio data.

The transmitting the signal requesting the playing of the first audio may include: based on a play stop signal corresponding to the second audio data being received from the second device within a first time from when the output of the second audio is started, ending the outputting of the second audio data.

The transmitting the signal requesting the playing of the first audio may further include: based on the play stop signal being received from the second device during the first time and based on at least one from among history information corresponding to a device stored in a memory of the electronic apparatus or audio duration time information corresponding to a plurality of application types stored in the memory, stopping the outputting of the second audio data and transmitting the signal requesting the playing of the first audio data to the first device.

The method may further include: identifying, based on the second play start signal being received from the second device while the first audio is being output, type information of an application from among the plurality of application types corresponding to the second audio data; and identifying, based on the identified type information of the application and the audio duration time information, a duration of the first time.

The method may further include: based on the second play start signal and the second audio data being received from the second device, identifying whether the second audio data is an alarm type based on at least one from among the second audio data or history information corresponding to the second device, based on the second audio data being identified as the alarm type, identifying whether the play stop signal is received from the second device during the first time, and based on identifying that the play stop signal was received during the first time, transmitting the signal requesting the playing of the first audio data to the first device.

The method may further include: based on the first play start signal being received in response to the signal requesting playing of the first audio, causing the first audio data to be output from a second play time point in the first audio data that precedes, by a pre-set time interval, a first play time point corresponding to a play time point in the first audio data when the output of the first audio data was stopped.

According to an aspect of the disclosure, a non-transitory computer-readable recording medium having instructions stored therein, which when executed by at least one processor cause the at least one processor to execute a method of controlling an electronic apparatus, wherein the method includes: based on first audio data and a first play start signal corresponding to the first audio data being received from a first device, outputting the first audio data; based on second audio data and a second play start signal corresponding to the second audio data being received from a second device while the first audio data is being output, stopping the outputting of the first audio data and outputting the second audio data; based on the outputting of the second audio data ending, transmitting a signal requesting playing of the first audio data to the first device; and based on the first play start signal being received subsequent to the transmitting of the signal requesting the playing of the first audio data, outputting the first audio data.

The transmitting the signal requesting the playing of the first audio may include: based on a play stop signal corresponding to the second audio data being received from the second device within a first time from when the output of the second audio is started, ending the outputting of the second audio data.

The transmitting the signal requesting the playing of the first audio may further include: based on the play stop signal being received from the second device during the first time and based on at least one from among history information corresponding to a device stored in a memory of the electronic apparatus or audio duration time information corresponding to a plurality of application types stored in the memory, stopping the outputting of the second audio data and transmitting the signal requesting the playing of the first audio data to the first device.

The method may further include: identifying, based on the second play start signal being received from the second device while the first audio is being output, type information of an application from among the plurality of application types corresponding to the second audio data; and identifying, based on the identified type information of the application and the audio duration time information, a duration of the first time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
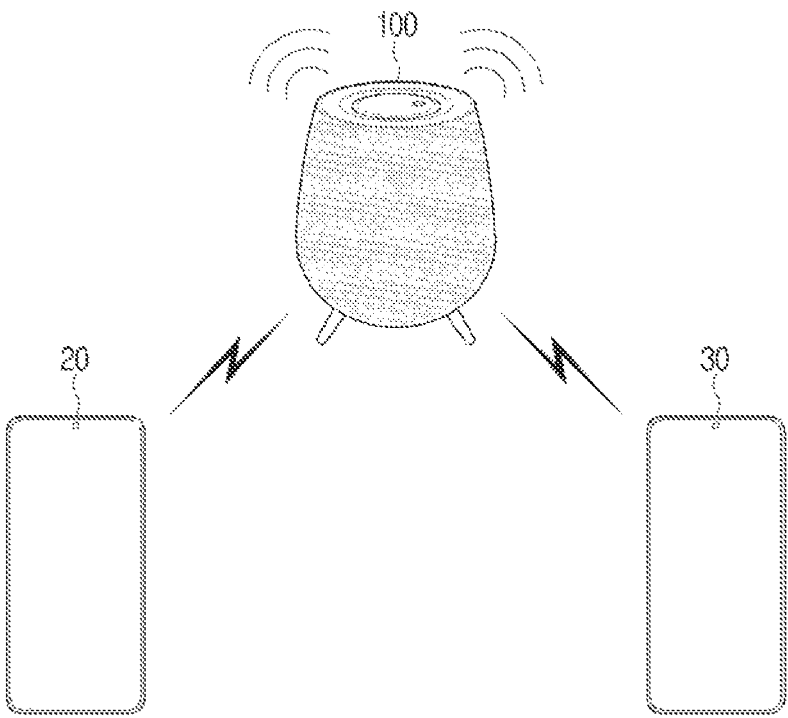
FIG. 1 is a diagram schematically illustrating a control method of an electronic apparatus of the related art according to one or more embodiments.

The disclosure will be described in detail below with reference to the accompanying drawings.

Terms used in the disclosure will be briefly described, and the disclosure will be described in detail.

The terms used in describing the embodiments of the disclosure are general terms that are currently widely used that have been selected considering their function herein. However, the terms may change depending on intention, legal or technical interpretation, emergence of new technologies, and the like of those skilled in the related art. Further, in certain cases, there may be terms arbitrarily selected, and in this case, the meaning of the term may be described in the corresponding description. Accordingly, the terms used herein may be understood, not simply by their designations, but based on the meaning of the term and the overall content of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it is to be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

In addition, a "deep neural network (DNN)" may be a representative example of an artificial intelligence neural network model which simulates brain nerves herein, and is not limited to an artificial neural network model that uses a specific algorithm.

In addition, a "parameter" may be a value used in a computing process of each layer that forms a neural network herein, and may include, for example, weight values which are used when applying an input value to a predetermined computation formula. In addition, the parameter may be represented in a matrix form. The parameter may be a value set based on a training result, and may be updated through separate training data if needed.

FIG. 1 is a diagram schematically illustrating a control method of an electronic apparatus of the related art according to one or more embodiments.

Referring to FIG. 1, according to one or more embodiments, an electronic apparatus 100 may receive audio data from a plurality of devices 20 or 30, and output audio corresponding to the received audio data.

According to one or more embodiments, the electronic apparatus 100 may be a device that outputs sound, and may be, for example, a speaker or a head-set with a Bluetooth function. However, the above is not limited thereto, and the electronic apparatus 100 according to an embodiment may perform communication with an external device by using not only a wireless communication method, but also a wired communication method. That is, the electronic apparatus 100 may be a speaker or a head-set that outputs sound using the wireless communication method.

According to one or more embodiments, the plurality of devices 20 or 30 may be a user terminal device. For example, the plurality of devices 20 or 30 may include at least one from among a smartphone, a tablet personal computer (PC), a laptop PC, a netbook computer, and a wearable device, but is not limited thereto, and may be implemented as a device of various types so long as it is a terminal device capable of performing communication with the electronic apparatus 100.

According to one or more embodiments, the electronic apparatus 100 may output, based on first audio data being received from a first device 20 from among the plurality of devices through the communication interface, a first audio based therefrom.

While the first audio is being output based on the data received from the first device 20, if audio data is received from a second device 30 due to a pre-set event occurring in the second device, the electronic apparatus 100 of the related art output, even when audio data is received from the second device 30, the first audio ignoring the audio data from the second device. Accordingly, the electronic apparatus 100 of the related art output a second audio received from the second device 30 after the output of the first audio is ended, and there has been a problem of a user belatedly recognizing the second audio.

Alternatively, according to one or more embodiments, while the first audio is being output based on data received from the first device 20, if audio data associated with the second audio is received from the second device 30 due to a pre-set event occurring in the second device, the electronic apparatus 100 of the related art output the second audio received from the second device 30 by stopping the output of the first audio. Thereby, there has been a problem of user satisfaction deteriorating due to usability decreasing because the first audio which was being played previously is not played after the output of the second audio is ended, and accordingly, the electronic apparatus 100 being in a continued silent state in which audio is no longer output.

Accordingly, various embodiments in which the usability of the electronic apparatus may be enhanced will be described below by having the audio that was being played previously to be output again when the output of the second audio is ended based on the audio data associated with the second audio being received from the second device while audio is being output based on the data received from the first device.

Figure 2:
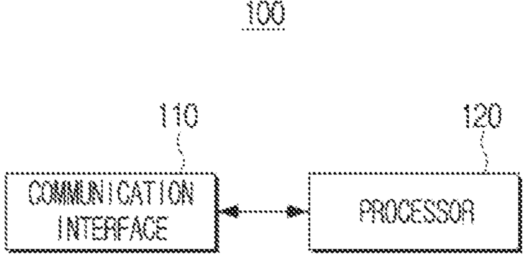
FIG. 2 is a block diagram illustrating a configuration of an electronic apparatus according to one or more embodiments.

FIG. 2 is a block diagram illustrating a configuration of an electronic apparatus according to one or more embodiments.

Referring to FIG. 2, the electronic apparatus 100 may include a communication interface 110 and at least one processor 120 (hereinafter, referred to as a processor).

According to one or more embodiments, the electronic apparatus 100 may be a device that outputs sound, and may be an electronic apparatus capable of performing communication with another electronic apparatus. For example, the electronic apparatus may be a speaker or head-set with a Bluetooth function, but is not limited thereto, and may be implemented to various devices capable of outputting sound such as, for example, and without limitation, a television (TV) including a smart TV, a tablet, a smartphone, a desktop computer, a laptop computer, and the like.

However, the above is not limited thereto, and the electronic apparatus 100 according to an example may perform communication with an external device using not only the wireless communication method, but also the wired communication method. That is, the electronic apparatus 100 may be a device that outputs sound using the wireless communication method.

However, the electronic apparatus 100 according to one or more embodiments is not limited to the above-described device, and may be implemented as a server capable of performing communication with another electronic apparatus.

The communication interface 110 may receive input of content of various types. For example, the communication interface 110 may receive input of a signal in a streaming or downloading method from an external device (e.g., a source device), an external storage medium (e.g., a USB memory), an external server (e.g., WEBHARD), or the like through a communication method such as, for example, and without limitation, an AP based Wi-Fi, Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

The communication interface 110 according to an example may use a same communication module (e.g., Wi-Fi) to communicate with an external device such as a remote control device and an external server.

The communication interface 110 according to another example may use a different communication module to communicate with the external device such as the remote control device and the external server. For example, the communication interface 110 may use at least one from among an Ethernet module or Wi-Fi to communicate with the external server, and use a Bluetooth module to communicate with the external device such as the remote control device. However, this is merely one embodiment, and the communication interface 110 may use at least one communication module from among various communication modules when communicating with a plurality of external devices or the external server.

According to one or more embodiments, the electronic apparatus 100 may transmit and receive data with the plurality of external devices through the communication interface 110. According to an example, the electronic apparatus 100 may transmit and receive data with an external device through the Bluetooth function. Here, the electronic apparatus 100 according to an example may use 2.45 GHz which is an Institute for Supply Management (ISM) wavelength.

According to one or more embodiments, a Bluetooth Audio/Video Distribution Transport Protocol and an Audio/Video Remote Control Profile Standard Application may be included.

However, the disclosure is not limited thereto, and the electronic apparatus 100 may perform communication with an external device using wireless or wired communication methods of different methods that include Wi-Fi as described above.

The at least one processor 120 (hereinafter, the processor) may control an overall operation of the electronic apparatus 100 by being electrically coupled with the communication interface 110. The processor 120 may be formed of one or a plurality of processors. Specifically, the processor 120 may perform, by executing at least one instruction stored in a memory, an operation of the electronic apparatus 100 according to the various embodiments of the disclosure.

According to one or more embodiments, the processor 120 may be implemented as a digital signal processor (DSP) for processing a digital image signal, a microprocessor, a graphics processing unit (GPU), an artificial intelligence (AI) processor, a neural processing unit (NPU), or a time controller (TCON). However, the above is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 120 may be implemented in a System on Chip (SoC) or a large scale integration (LSI) in which a processing algorithm is embedded, and may be implemented in a form of an application specific integrated circuit (ASIC) and a field programmable gate array (FPGA).

The processor 120 according to one or more embodiments may be implemented as a digital signal processor (DSP), a microprocessor, or a time controller (TCON). However, the disclosure is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term.

According to one or more embodiments, the processor 120 may output audio that is received from a first device.

According to an example, the processor 120 may output, based on a play start signal of a first audio being received from the first device from among the plurality of devices through the communication interface 110, the first audio that is received from the first device. Here, the play start signal of the first audio may be a signal that the electronic apparatus 100 controls to start playing of the first audio, and may be, for example, an Audio/Video Distribution Transport Protocol (AVDTP) start signal or an Audio/Video Remote Control Profile (AVRCP) play signal.

According to an example, the processor 120 may output the first audio when a signal including the first audio data is received from the first device through the communication interface 110. Here, the first audio may be, for example, an audio associated with an image that is displayed in the first device or voice data that is played in the first device, but is not limited thereto.

According to one or more embodiments, the processor 120 may stop the output of the first audio and output the second audio that is received from a second device.

Here, the second audio (also referred to as "second audio data") that is received according to an example may be an audio of an alarm type. The audio that is received according to an example may be an alarm corresponding to a specific application that includes a messenger alarm or a morning call alarm, but is not limited thereto, and may be an alarm with different audio data according to a type of application. In this case, a play time (or, an output time) of an alarm based on the type of application according to an example may be different.

Alternatively, the second audio according to an example may be audio of a sound effect type. For example, the second audio may be a sound effect that corresponds to a specific application, but is not limited thereto, and may be a sound effect having different audio data according to the application type.

The above-described second audio may be audio of various types of which an audio play time is less than a pre-set size in addition to the alarm or the audio of the sound effect type according to one or more embodiments.

According to an example, the processor 120 may stop, based on a signal corresponding to a play start of the second audio (or, a play start signal of the second audio) being received from the second device from among the plurality of devices through the communication interface 110 while the first audio is being output, the output of the first audio and output the second audio that is received from the second device.

Here, the play start signal of the second audio may be a signal that the electronic apparatus 100 controls to output the second audio. The second audio play start signal may be the Audio/Video Distribution Transport Protocol (AVDTP) start signal or the Audio/Video Remote Control Profile (AVRCP) play signal according to an example.

For example, the processor 120 may stop, based on the second audio play start signal (e.g., an alarm play start signal) being received from the second device through the communication interface 110 while outputting the first audio (e.g., the audio associated with the image that is displayed in the first device) based on a control signal received from the first device, the output of the first audio and output the second audio.

According to one or more embodiments, the processor 120 may transmit, based on the output of the second audio being ended, a signal requesting the playing of the first audio (or, a play request signal of the first audio) to the first device through the communication interface 110.

Here, the play request signal of the first audio may be a signal requesting for the first device to transmit the play start signal of the first audio. The play request signal according to an embodiment may be the Audio/Video Remote Control Profile (AVRCP) play signal. The first device that received the play request signal may transmit the play start signal of the first audio to the electronic apparatus 100 even if there is no separate user input. That is, the first device which received the play request signal of the first audio from the electronic apparatus 100 may be able to automatically execute the playing of the first audio.

According to an example, the processor 120 may end, based on a signal corresponding to a play stop of the second audio (or, second audio stop signal) being received from the second device through the communication interface 110, the output of the second audio, and transmit the play request signal of the first audio to the first device through the communication interface 110.

Here, the second audio stop signal may be a control signal for ending the output of the second audio by the electronic apparatus 100. The second audio stop signal may be, for example, an Audio/Video Distribution Transport Protocol (AVDTP) pause signal or an Audio/Video Remote Control Profile (AVRCP) stop signal, but is not limited thereto.

For example, the processor 120 may end, based on the second audio stop signal being received from the second device through the communication interface 110 during a first time from when the second audio is output, the output of the second audio and transmit the play request signal of the first audio to the first device through the communication interface 110.

Here, the first time (or, a first time interval) may be a time interval which is based on a time point at which the alarm is output to a time point at which a pre-set time is passed. According to an example, the size of the first time interval may be a value stored at an initial setting, but is not limited thereto, and may have different values according to a user input, a type of device performing communication with an electronic apparatus, a communication form (e.g., Bluetooth, Wi-Fi, etc.), history information, and user identification information (user ID information), and the like. The above will be described in detail through FIG. 4 to FIG. 7.

According to one or more embodiments, the processor 120 may output, based on a signal corresponding to a play start of the first audio that corresponds to the play request signal of the first audio being received from the first device through the communication interface 110, the first audio received from the first device.

According to one or more embodiments, the processor 120 may output the above-described first audio or second audio through a speaker provided in the electronic apparatus 100, but is not limited thereto, and when the electronic apparatus 100 is implemented as a server according to an example, the processor 120 may transmit, to another device, a signal associated with the first audio or the second audio for the first audio or the second audio to be output from another device (e.g., a Bluetooth speaker or a user terminal). The above will be described in detail through FIG. 10.

Figure 3:
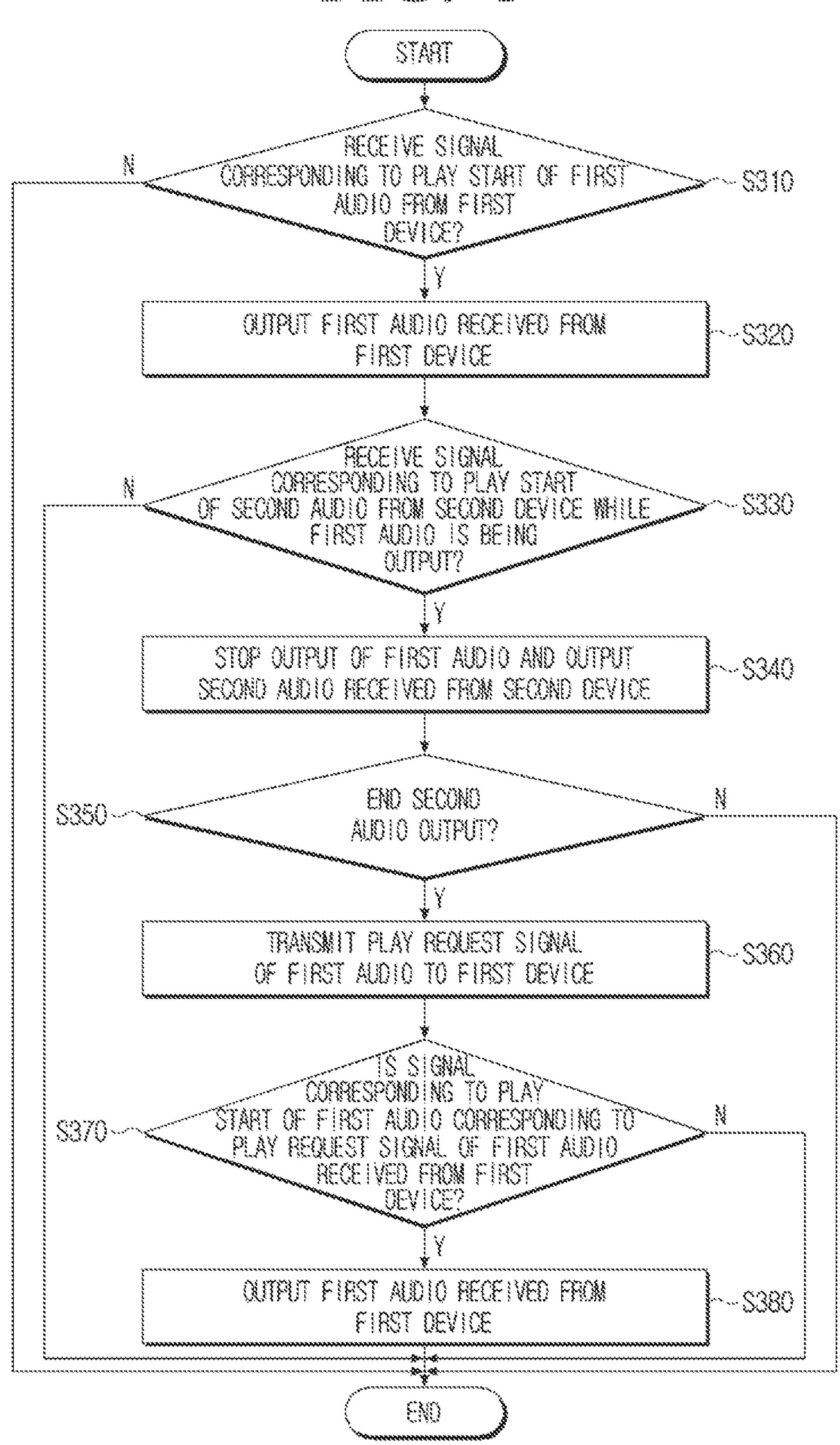
FIG. 3 is a flowchart illustrating a method of outputting audio by an electronic apparatus according to one or more embodiments.

FIG. 3 is a flowchart illustrating a method of outputting audio by an electronic apparatus according to one or more embodiments.

Referring to FIG. 3, a control method according to one or more embodiments may include identifying whether the play start signal of the first audio is received from the first device (S310). According to an example, the control method may include identifying whether the play start signal of the first audio that is played in the first device is received through the communication interface 110.

Then, according to one or more embodiments, the control method may include outputting, based on the play start signal of the first audio being received (Y), the first audio received from the first device (S320). According to an example, the control method may include receiving, based on a control signal corresponding to the play start of the first audio being received from the first device through the communication interface 110, audio data corresponding to the first audio from the first device, and outputting the first audio based therefrom.

In this case, according to an example, the control signal corresponding to the play start of the first audio (or, first audio play start signal) and the audio data corresponding to the first audio may be transmitted and received as one communication packet by being grouped. According to an example, the control method may include receiving information associated with the first audio that includes the play start signal of the first audio and the audio data corresponding to the first audio from the first device.

Then, the control method according to one or more embodiments may include identifying whether the second audio play start signal is received from the second device while the first audio is being output (S330). According to an example, the control method may include identifying, while outputting the first audio based on audio corresponding to the first audio received from the first device, whether the second audio play start signal is received from the second device through the communication interface 110.

Then, according to one or more embodiments, the control method may include stopping, based on the second audio play start signal being received from the second device (Y), the output of the first audio and output the second audio received from the second device (S340). According to an example, the control method may include stopping, based on the second audio play start signal being received from the second device while the first audio is being output, the output of the first audio and receive data corresponding to the second audio from the second device, and output the second audio based therefrom.

Then, the control method according to one or more embodiments may include identifying whether to end the output of the second audio (S350). According to an example, the control method may include identifying, based on the output of the first audio being stopped and the second audio being output, whether the output of the second audio is ended based on a second audio play stop signal received from the second device.

For example, if a play time of the second audio is 10 seconds, the second audio stop signal may be received from the first device from a time point at which the second audio is played to a time point after when the 10 seconds has passed, and the control method may include ending the output of the second audio when the second audio stop signal is received. However, the disclosure is not limited to the above description, and the control method may include ending the output of the second audio when the second audio stop signal is received from the second device during the first time interval from when the second audio is output. The above will be described in detail through FIG. 4 to FIG. 7.

Then, the control method according to one or more embodiments may include transmitting, based on the output of the second audio being ended (Y), the play request signal of the first audio to the first device (S360). According to an example, the control method may include ending, based on the second audio stop signal being received from the first device after 10 seconds has passed from the time point at which the second audio is played, the output of the second audio. The control method may include transmitting the play request signal of the first audio to the first device as the output of the second audio is ended.

Then, the control method according to one or more embodiments may include identifying whether the play start signal of the first audio corresponding to the play request signal of the first audio is received from the first device (S370). Then, the control method according to one or more embodiments may include outputting, based on the play start signal of the first audio corresponding to the play request signal of the first audio being received (Y), the first audio received from the first device (S380).

The control method according to an example may include outputting, based on the play start signal of the first audio corresponding to the play request signal of the first audio being received from the first device, the first audio based on audio data corresponding to the first audio received from the first device.

Accordingly, the electronic apparatus 100 may again output, based on a control signal which ends the second audio output before the pre-set time is passed being received, the audio prior to the second audio being output. Accordingly, the electronic apparatus 100 may not generate a silent state, and user satisfaction may be enhanced.

Here, the silent state may refer to a state in which the audio is not output through the electronic apparatus 100 because the previous first audio is not played again after the playing of the second audio is ended. That is, even when the second audio such as an alarm is played during the playing of the first audio, the electronic apparatus 100 may be able to output the previous first audio again after the playing of the second audio is ended, and accordingly, a state in which audio is not output after the playing of the second audio is ended may be prevented.

Figure 4:
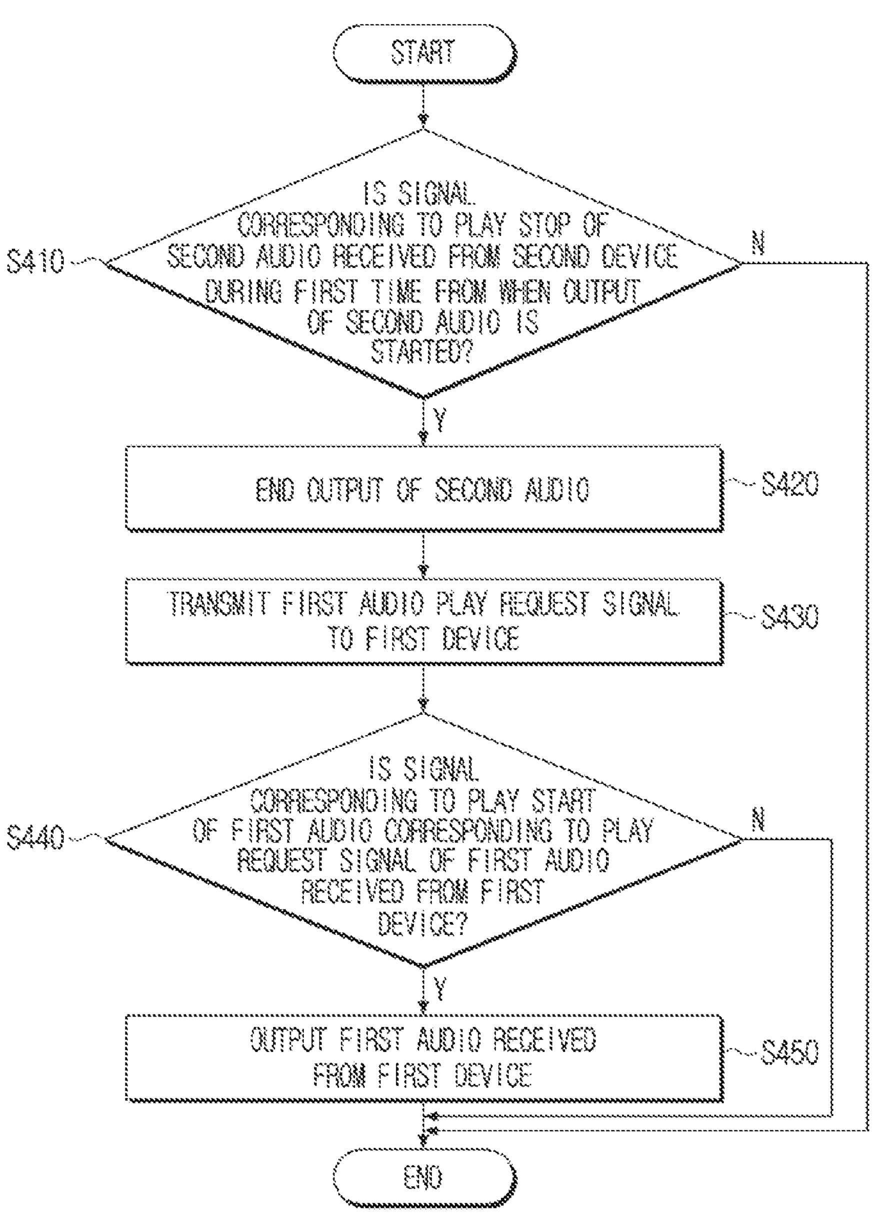
FIG. 4 is a flowchart illustrating an audio output method of an electronic apparatus according to one or more embodiments.

FIG. 4 is a flowchart illustrating an audio output method of an electronic apparatus according to one or more embodiments.

Referring to FIG. 4, according to one or more embodiments, the control method may first include identifying whether the second audio stop signal is received from the second device during the first time interval from when the second audio is output (S410). According to an example, the control method may include identifying, based on the second audio being output based on the received second audio play start signal, whether the second audio stop signal is received from the second device through the communication interface 110 for 10 seconds from when the output of the second audio is started.

Then, the control method according to one or more embodiments may include ending, based on the second audio stop signal being received from the second device during the first time interval from when the second audio is output (Y), the output of the second audio (S420). According to an embodiment, the control method may include ending the output of the second audio based on the second audio stop signal being received from the second device before 10 seconds, which is the size of the first time interval from when the second audio is output, is passed.

Then, the control method according to one or more embodiments may include transmitting, based on the output of the second audio being ended, the play request signal to the first device (S430).

Then, the control method according to one or more embodiments may include identifying whether the play start signal of the first audio corresponding to the play request signal of the first audio is received from the first device (S440). Here, the play request signal of the first audio according to an example may be the Audio/Video Remote Control Profile (AVRCP) play signal.

Then, when the play start signal of the first audio corresponding to the play request signal of the first audio is received from the first device according to one or more embodiments, the control method may include outputting the first audio received from the first device (S450).

Because the play time of the second audio is relatively shorter compared to audios of different types (e.g., music, image audio, etc.), the control method may transmit, based on a stop signal of the second audio being received before the pre-set time is passed from when the second audio is output, the play request signal to the first device. Accordingly, even if the stop signal of the second audio is received and the output of the second audio is ended, the electronic apparatus 100 may output the first audio, and accordingly, the silent state of the electronic apparatus 100 may not occur.

Figure 5:
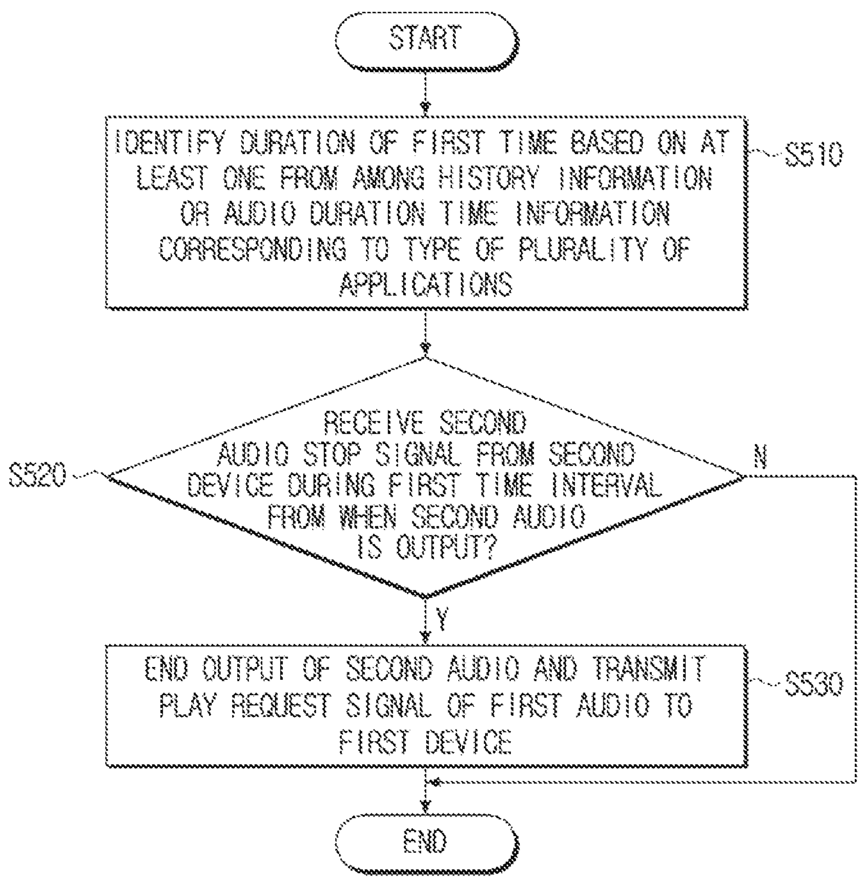
FIG. 5 is a flowchart illustrating a method of identifying a size of a first time interval according to one or more embodiments.

FIG. 5 is a flowchart illustrating a method of identifying a size of a first time interval according to one or more embodiments.

According to one or more embodiments, the electronic apparatus 100 may include a memory in which at least one from among history information or audio duration time information corresponding to types of a plurality of applications that correspond to the plurality of devices, respectively, are stored.

Here, the history information that corresponds to the plurality of devices, respectively, may be information associated with a use history corresponding to the respective devices that perform communication with the electronic apparatus 100, and may include, for example, information associated with a duration time of an audio used before by a user that corresponds to the respective devices. Alternatively, for example, information associated with a number of times used (or, number of outputs) of each of the different type audios that were used before by the user may be included.

However, the disclosure is not limited thereto, and information associated with the number of times each of the different types of audio that were output from a corresponding device, regardless of the user, is used, or information associated with the audio duration time of different types that correspond to the respective devices, may also be included according to an embodiment.

Alternatively, for example, information on a number of times an alarm is used for each pre-set time interval (e.g., 8:00 a.m. to 10:00 a.m.), or information associated with a duration time of an alarm, may be included. That is, the history information may include different information according to a plurality of users that correspond to the plurality of devices, respectively, and different history information according to time intervals for each of the users may be stored according to an embodiment.

The audio duration time information that corresponds to the plurality of application types may be information associated with a duration time of an audio (or, audio play time) for outputting audio corresponding to the respective applications, and a method of identifying a duration of the first time interval according to the application type will be described in detail through FIG. 6.

According to an embodiment, the memory may store information associated with the audio duration time that corresponds to each of the application types, and the control method may identify the duration of the first time interval based on the information stored in the memory.

Referring to FIG. 5, the control method according to one or more embodiments may include identifying the duration of the first time interval based on at least one from among the history information or the audio duration time information corresponding to the plurality of application types (S510).

According to an embodiment, the control method may include identifying, based on a duration time of the second audio corresponding to the second device being identified as 8 seconds based on the information stored in the memory, the duration of the first time interval as 8 seconds.

Alternatively, the control method according to one or more embodiments may include identifying, based on the duration time of the audio used by the user being different based on the history information stored in the memory, an average value associated with the audio duration time of different lengths as the duration of the first time interval. In this case, the control method according to an example may include identifying the duration of the first time interval based on an audio duration time of less than a threshold value.

For example, if an alarm duration time is 3 seconds, 8 seconds, 10 seconds, and 60 seconds, respectively, the control method may include identifying the duration of the first time interval as 7 seconds (=(3+8+10)/3) based on the duration of the alarm being less than 30 seconds which is the threshold value. However, the disclosure is not limited thereto, and the control method according to an example may include identifying a maximum value, from among the audio duration times, that is less than the threshold value as the duration of the first time interval. In the above-described example, the duration of the first time interval may be 10 seconds.

Alternatively, the control method according to an example may include identifying the duration of the first time interval based on the information on the number of times the audio is used (or, output) for each of the pre-set time intervals (e.g., 8:00 a.m. to 10:00 a.m.), or information associated with a duration time of an audio. For example, the control method may include identifying, based on a first alarm of which the audio duration time is 8 seconds being the most output in between 8:00 a.m. and 10:00 a.m. based on the information stored in the memory, the duration of the first time interval as 8 seconds. In this case, the control method according to an example may include identifying the duration of the first time interval based only on information associated with the audio having a duration of less than the threshold value.

Then, the control method according to one or more embodiments may include identifying whether the second audio stop signal is received from the second device during the identified first time interval from when the second audio is output (S520). According to an embodiment, the control method may include identifying, based on the duration of the first time interval being identified as 8 seconds based on the history information, whether the second audio stop signal is received from the second device before 8 seconds is passed from when the second audio is output.

Then, the control method according to one or more embodiments may include ending the output of the second audio and transmitting the play request signal of the first audio to the first device (S530). According to an embodiment, the control method may include ending, based on the second audio stop signal being received from the second device before 8 seconds (which is the duration of the first time interval) is passed from when the second audio is output based on the history information, the output of the second audio and transmitting the play request signal of the first audio to the first device.

According to one or more embodiments, the audio duration time information corresponding to a plurality of user terminal device types may be included in the memory. According to one or more embodiments, the processor 120 may identify the duration of the first time interval based on the audio duration time information corresponding to the plurality of external device types stored in the memory.

According to an embodiment, the processor 120 may identify the duration of the first time interval based on the type of external device (e.g., user terminal) that performs communication with the electronic apparatus 100. Here, the type of external device, according to an embodiment, may be a brand type of the external device or a model type of the external device. According to an embodiment, the memory may store the audio duration time information corresponding to each brand of the plurality of external devices, or store the audio duration time information corresponding to each model type of the external devices.

For example, the processor 120 may identify the type of the second device based on identification information (e.g., model name or ID information) of the second device that performs communication with the electronic apparatus 100, and identify the audio duration time information corresponding to the second device based on the information stored in the memory. Then, the processor 120 may identify the duration of the first time interval based on the identified duration time information.

According to the above-described example, the first time interval may be identified based on information corresponding to characteristics of each user, for example, the use history of the user, and accordingly, whether the audio data received from the second device is an alarm may be identified considering a situation of each user.

Figure 6:
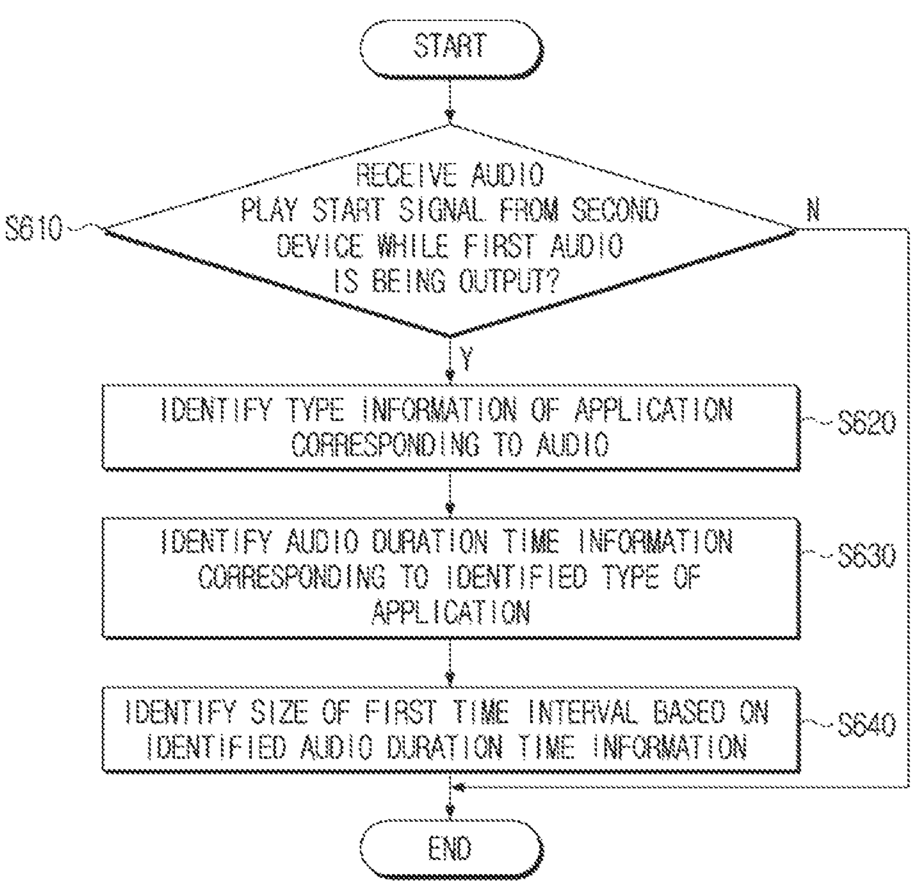
FIG. 6 is a flowchart illustrating a method of identifying a size of a first time interval according to one or more embodiments.

FIG. 6 is a flowchart illustrating a method of identifying a duration of a first time interval according to one or more embodiments.

According to one or more embodiments, the electronic apparatus 100 may include a memory storing audio duration time information corresponding to the plurality of application types. Here, the audio duration time information corresponding to the plurality of application types may be information associated with a duration time of an audio (or, audio play time) for performing an alarm function corresponding to the respective applications.

According to an example, when a text message is received in the electronic apparatus 100 and a duration (or amount) of time that the alarm corresponding to a receipt of the text message is maintained is 3 seconds, the alarm duration time corresponding to a text application may be 3 seconds, and the alarm duration time corresponding to a morning call application may be 8 seconds. However, the disclosure is not limited thereto, and audio duration time information corresponding to applications that provide an alarm to the user such as applications of different types, for example, and without limitation, a messenger application, a social networking service (SNS) application, and the like may also be included.

According to an example, the memory may store information associated with the audio duration time corresponding to the respective application types, and the control method may include identifying the duration of the first time interval based on the information stored in the memory.

Referring to FIG. 6, the control method according to one or more embodiments may include identifying whether the audio play start signal is received from the second device while the first audio is being output (S610). According to an embodiment, the control method may include identifying, while the first audio is being output based on the audio data received from the first device, whether the audio play start signal is received from the second device.

Then, the control method according to one or more embodiments may include identifying type information of an application corresponding to the audio (S620). According to an example, when a text message (or, text message application) alarm is received from the second device, the control method may include identifying the type of audio received from the second device as the text message alarm based on the information stored in the memory.

According to an embodiment, in the audio play start signal received from the second device and information associated with audio including audio data that corresponds to the audio (or, audio information), identification information associated with an application corresponding to the audio (e.g., metadata corresponding to the respective applications) may be included.

Alternatively, the control method according to an example may include identifying an application type corresponding to the alarm by inputting audio data corresponding to the alarm in the trained neural network model.

Then, the control method according to one or more embodiments may include identifying the audio duration time information corresponding to the identified type of application (S630).

According to an example, when the type of alarm received from the second device is identified as a text message alarm, the control method may include identifying the alarm duration time information corresponding to the text message application identified based on the information stored in the memory as 2 seconds. However, the disclosure is not limited thereto, and the alarm duration time information corresponding to the plurality of application types may vary according to the user input, or the like.

Then, the control method according to one or more embodiments may include identifying the duration of the first time interval based on the identified audio duration time information (S640).

According to an example, the control method may include identifying, based on the alarm duration time information corresponding to the identified text message application being identified as 2 seconds, the identified alarm duration time of 1 second as the duration of the first time interval. Accordingly, the control method may include ending, based on a stop signal of the alarm being received within 1 second from the time point at which the alarm is output (or played) from the second device, the output of the alarm and transmit the play request signal of the first audio to the first device.

Referring back to FIG. 2, the processor 120 according to one or more embodiments may identify the duration of the first time interval based on the user input.

According to an example, the electronic apparatus 100 may further include a user interface, and the processor 120 may identify, based on the user input corresponding to the duration of the first time interval being received through the user interface, the duration of the first time interval based on the received user input. In this case, the processor 120 according to an example may display a user interface (UI) for receiving the user input corresponding to the duration of the first time interval through a display.

For example, the processor 120 may identify, based on the user input for setting the duration of the first time interval being received as 8 seconds through the user interface, the duration of the first time interval as 8 seconds based on the received user input.

However, the disclosure is not limited thereto, and the processor 120 according to an embodiment may receive user input information for identifying the duration of the first time interval from the first device or the second device, and identify the duration of the first time interval based therefrom.

Figure 7:
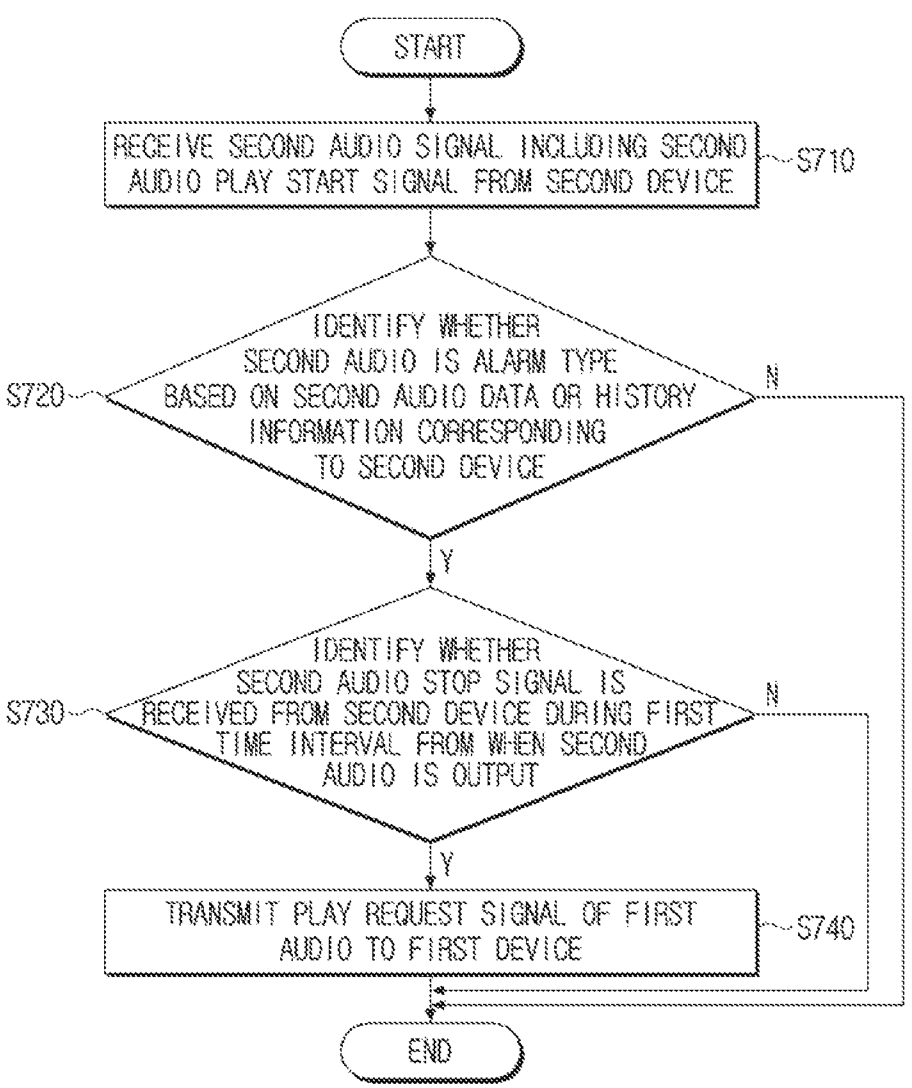
FIG. 7 is a flowchart illustrating a method of identifying a type of audio according to one or more embodiments.

FIG. 7 is a flowchart illustrating a method of identifying a type of audio according to one or more embodiments.

Referring to FIG. 7, first, the control method according to one or more embodiments may include receiving the second audio play start signal from the second device and second audio information (or, information associated with the second audio) including second audio data (S710). Here, the second audio data may be data associated with a digital signal corresponding to an audio being played in the second device.

Then, the control method according to one or more embodiments may include identifying whether the second audio is an alarm type based on the second audio data or the history information corresponding to the second device (S720). According to an embodiment, the control method may include identifying whether the second audio is an alarm type by comparing the second audio data and sample data associated with the alarm.

For example, the memory may store audio data associated with the alarm (or, sample data associated with the alarm) corresponding to each application that perform the alarm function, and the processor 120 may identify whether the second audio is an alarm type by comparing the audio data associated with the alarm stored in the memory.

Alternatively, the control method according to an example may include identifying whether the second audio is an alarm type based on the history information corresponding to the second device. According to an embodiment, the memory may store history information associated with an application used by the user, and the control method may include identifying whether the second audio is an alarm type by comparing audio data associated with the alarm corresponding to each application used by the user and the second audio data based on the information stored in the memory.

Then, according to one or more embodiments, based on the second audio being identified as an alarm type based on the second audio data or the history information corresponding to the second device (Y), the control method may include identifying whether the second audio stop signal is received from the second device during the first time interval from when the second audio is output (S730).

According to an embodiment, based on the second audio being identified as not an alarm type based on the second audio data or the history information corresponding to the second device (N), the control method may include continuously outputting the second audio that is currently being output.

Then, when the second audio stop signal is received from the second device during the first time interval according to one or more embodiments (Y), the control method may include transmitting the play request signal of the first audio to the first device (S740).

Referring back to FIG. 2, the processor 120 according to one or more embodiments may also identify whether the second audio is an alarm type using the trained neural network model.

The processor 120 may process input data according to a pre-defined operation rule or an artificial intelligence model stored in the memory. The pre-defined operation rule or the artificial intelligence model (or, neural network model) may be created through learning.

The "being created through learning" referred to herein refers to the pre-defined operation rule or artificial intelligence model with a desired feature being created by applying a learning algorithm to the plurality of learning data. The learning described above may be carried out in the device itself in which the artificial intelligence according to the disclosure is performed, or carried out through a separate server and/or system.

According to an embodiment, the electronic apparatus 100 may further include a memory in which a trained neural network model is stored. The artificial intelligence model may be formed of a plurality of neural network layers. At least one layer may include at least one weight value, and perform processing of the layer through a processing result of a previous layer and at least one defined processing. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, and a Transformer, and the neural network of the disclosure is not limited to the above-described example unless otherwise specified.

The learning algorithm may be a method for training a predetermined target machine (e.g., robot) to make decisions or predictions on its own using the plurality of learning data. Examples of the learning algorithm may include a supervised learning, an unsupervised learning, a semi-supervised learning, or a reinforcement learning, and the learning algorithm of the disclosure is not limited to the above-described examples unless otherwise specified.

According to an example, the processor 120 may identify whether the second audio is an alarm type by inputting the second audio data to the trained neural network model. In this case, the trained neural network model may be trained using the plurality of application types that perform the alarm function and the audio data associated with the alarm (or, sample data associated with the alarm) corresponding to the plurality of applications respectively as learning data.

Accordingly, the electronic apparatus 100 may be able to identify the type of the second audio based on the audio data and the history information, and if the second audio is identified as an alarm type, the electronic apparatus 100 may output the first audio again when the output of the second audio is ended.

Figure 8:
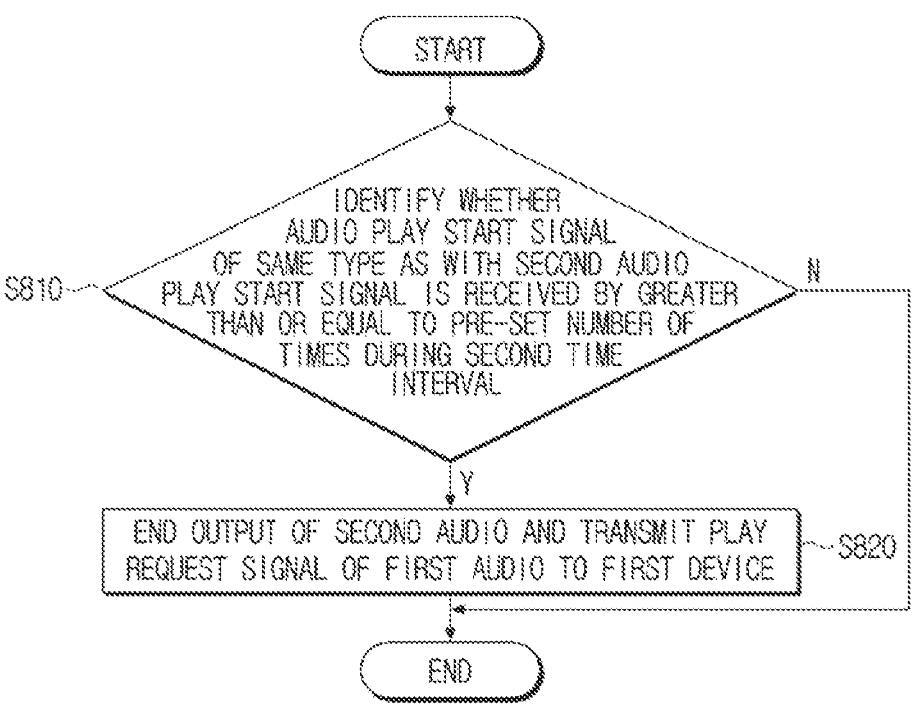
FIG. 8 is a flowchart illustrating a control method of when a same type alarm play start signal is received according to one or more embodiments.

FIG. 8 is a flowchart illustrating a control method where a same type of second audio play start signal is received according to one or more embodiments.

Referring to FIG. 8, first, the control method according to one or more embodiments may include identifying whether an audio play start signal of the same type as the second audio play start signal is received greater than or equal to a pre-set number of times during the second time interval (S810). Here, the second time interval may refer to a time interval which is from the time point at which the second audio play start signal is first received in the electronic apparatus 100 to the time point at which the pre-set time is passed.

The audio play start signal of the same type may be an audio corresponding to an application of a same type according to an example, but is not limited thereto, and may be an audio received from the same device according to an example.

According to an example, the play start signal associated with the text message alarm being received from the second device may be assumed. If the duration of the second time interval is 10 seconds, the control method may include identifying a number of times the play start signal corresponding to the text message alarm is received from the time point at which the play start signal corresponding to the text message alarm is first received to before the time of 10 seconds is passed. According to an example, the control method may include identifying whether the identified number of receipts is greater than or equal to a pre-set number of times (e.g., 3 times).

Then, based on the audio play start signal of the same type as the second audio play start signal being received by greater than or equal to a pre-set number of times during the second time interval from the second device (Y), the control method according to one or more embodiments may include ending the output of the second audio and transmitting the play request signal of the first audio to the first device (S820).

According to an example, the control method may end the output of the alarm and transmit the play request signal of the first audio to the first device based on an alarm of the same type as the text message alarm being received 4 times and thus exceeding 3 times (which is the pre-set number of times during 10 seconds which is the second time interval).

Accordingly, the electronic apparatus 100 may end, based on the same alarm being repeated and played, the output of the alarm and may be able to output the first audio that was being played previously, and accordingly, user satisfaction may be enhanced.

Referring back to FIG. 2, according to one or more embodiments, the first audio which is output after the play start signal of the first audio corresponding to the play request signal of the first audio is received may be output again based on a play time point (or, output time point) prior to the pre-set time to a first play time point at which the output of the first audio is stopped.

For example, when the output of the first audio is stopped at a time point at which 30 seconds has passed after the start of the first audio being output, the first play time point may be the time point at the time point at which 30 seconds has passed after the start of the first audio is output. When the play start signal of the first audio corresponding to the play request signal of the first audio is received, the first audio may be output again based on the play time point prior to a threshold time (e.g., 5 seconds). In the above-described example, the first audio may be output again based on the play time point at a time point at which 25 seconds is passed after the start of the first audio being output.

However, the disclosure is not limited thereto, and when the play start signal of the first audio corresponding to the play request signal of the first audio is received according to an example, the first audio may be output again based on the first play time point at which the output of the first audio is stopped.

For example, when the output of the first audio is stopped at the time point at which 30 seconds is passed after the start of the first audio being output, the first play time point may be the play time point at which 30 seconds is passed after the start of the first audio being output. In this case, the first audio may be output again based on the time point at which 30 seconds is passed after the start of the first audio being output.

Figure 9:
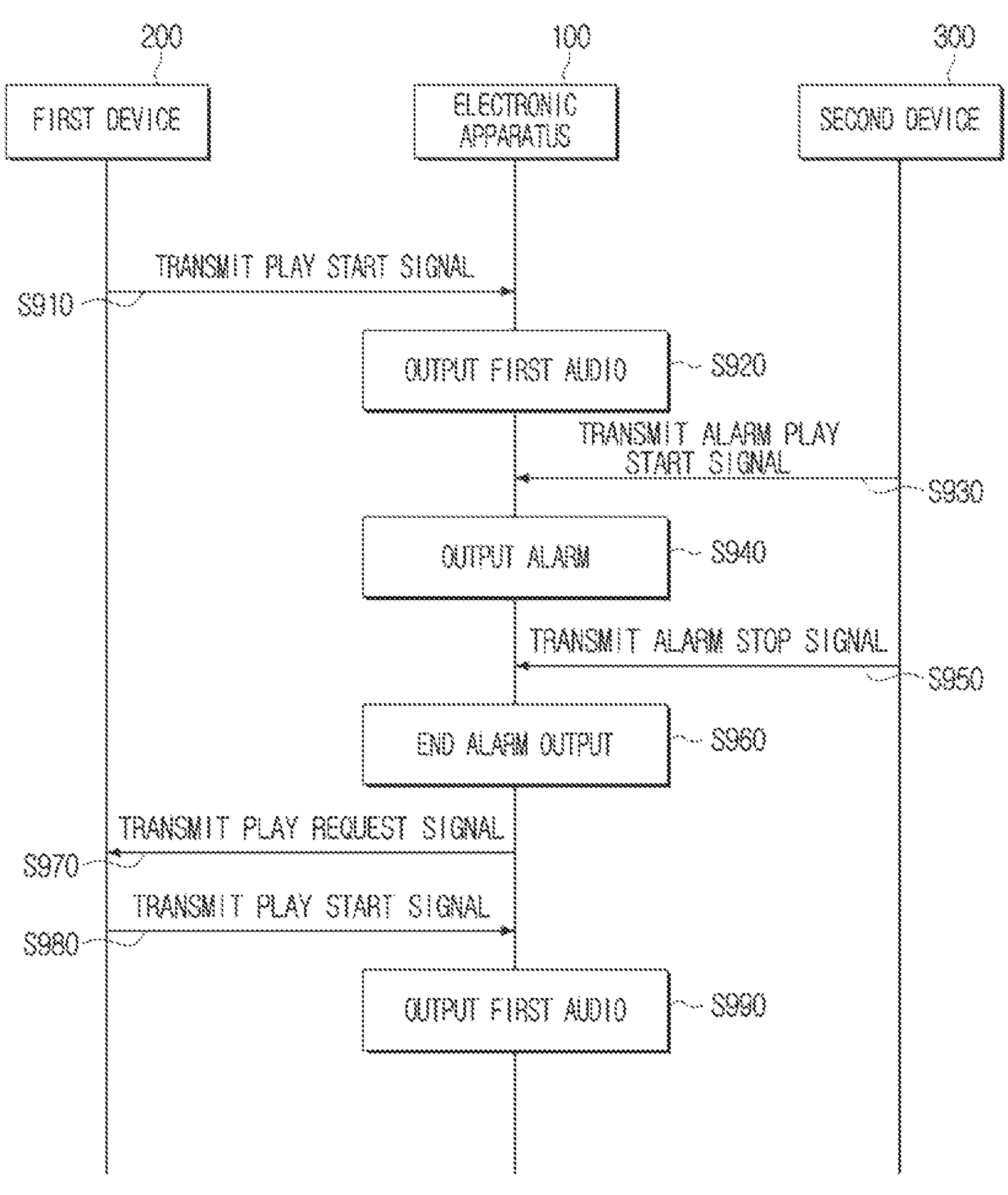
FIG. 9 is a sequence diagram illustrating a control method of an electronic apparatus according to one or more embodiments.

FIG. 9 is a sequence diagram illustrating a control method of an electronic apparatus according to one or more embodiments.

Referring to FIG. 9, first, a first device 200 according to one or more embodiments may transmit the play start signal of the first audio to the electronic apparatus 100 (S910). According to an example, the first device 200 may transmit, based on a pre-set event occurring (e.g., receiving the user input for playing the first audio), the information associated with the first audio that includes the play start signal of the first audio and the first audio data to the electronic apparatus 100 through the communication interface.

Then, the electronic apparatus 100 according to one or more embodiments may output the first audio (S920). According to an example, the electronic apparatus 100 may output, based on the information associated with the first audio that includes the play start signal of the first audio and the first audio data being received from the first device 200, the first audio through an outputter based on the first audio data. The outputter may include a speaker, a display, a vibration generator, and the like, but is not limited thereto, and may be formed in various embodiments that transfer information in a form that can be sensed by the five senses of the user.

Then, a second device 300 according to one or more embodiments may transmit the second audio play start signal to the electronic apparatus 100 (S930). According to an example, the second device 300 may transmit, based on a pre-set event occurring (e.g., an alarm event occurring based on the text message being received in the second device), the play start signal for playing the alarm associated with the text message and information associated with the alarm that includes the audio data associated with the alarm to the electronic apparatus 100 through the communication interface.

Then, the electronic apparatus 100 according to one or more embodiments may output the second audio (S940). According to an example, the electronic apparatus 100 may output, based on the information associated with the alarm that includes the alarm play start signal associated with the text message being received from the second device, the alarm through the outputter based on the audio data associated with the alarm.

Then, the second device 300 according to one or more embodiments may transmit the second audio stop signal to the electronic apparatus 100 (S950). According to an example, the second device 300 may transmit the stop signal of the alarm to the electronic apparatus 100 when the alarm play time (e.g., 2 seconds) associated with the text message is passed.

However, the disclosure is not limited thereto, and the stop signal of the alarm may be transmitted to the electronic apparatus 100 as one communication packet by being grouped with the play start signal of the alarm and the audio data associated with the alarm.

Then, the electronic apparatus 100 according to one or more embodiments may end the output of the second audio (S960). According to an example, when the stop signal of the text message alarm is received from the second device 300 due to the pre-set time passing (S950), the electronic apparatus 100 may end the output of the text message alarm.

Then, the electronic apparatus 100 according to one or more embodiments may transmit the play request signal to the first device 200 (S970). According to an example, the electronic apparatus 100 may end, based on the alarm stop signal of the text message being received from the second device 300 during the time point at which 3 seconds (which is the duration of the first time interval) is passed from the time point at which the text message alarm is output, the output of the text message alarm and transmit the play request signal of the first audio to the first device 200 through the communication interface 110.

Then, the first device 200 according to one or more embodiments may transmit the play start signal to the electronic apparatus 100 (S980). According to an example, the first device 200 may transmit, based on the play request signal of the first audio being received from the electronic apparatus 100, the play start signal of the first audio and the information associated with the first audio that includes the first audio data to the electronic apparatus 100.

In this case, the first device 200 according to an example may transmit, based on the play request signal of the first audio being received from the electronic apparatus 100 even when there is no separate user input, the information associated with the first audio that includes the play start signal of the first audio to the electronic apparatus 100. That is, the first audio may be played even if the user of the first device 200 does not provide an input for the playing of the first audio separately.

Then, the electronic apparatus 100 according to one or more embodiments may output the first audio (S990). According to an example, the electronic apparatus 100 may output, based on the play start signal of the first audio and the information associated with the first audio that includes the first audio data being received from the first device 200, the first audio through the outputter. In this case, the electronic apparatus 100 according to an example may output the first audio based on a time point at which the output of the first audio was stopped (this being the play time point of the first audio).

Accordingly, the electronic apparatus 100 may play, based on the alarm received from the second device 300 being ended within the pre-set time, the first audio again after the output of the alarm is ended, and accordingly, the problem of the audio no longer being output after the alarm is ended may be solved. Accordingly, user satisfaction and convenience may be increased.

Figure 10:
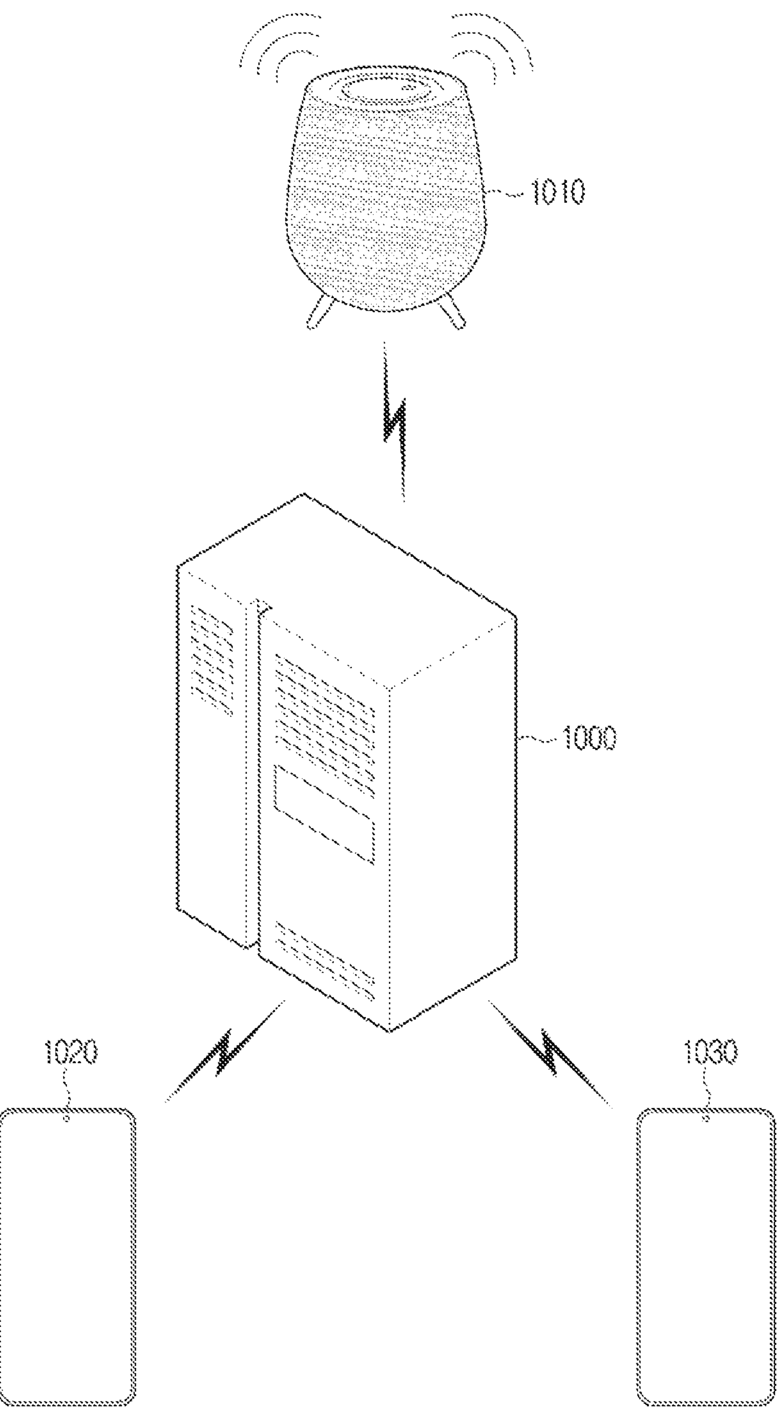
FIG. 10 is a diagram schematically illustrating an implementation method of an electronic apparatus according to one or more embodiments.

FIG. 10 is a diagram schematically illustrating an implementation method of an electronic apparatus according to one or more embodiments.

The electronic apparatus 100 according to one or more embodiments may be implemented as a speaker, but is not limited thereto, and may also be implemented as a server 1000 as shown in FIG. 10. According to an example, when the electronic apparatus 100 is implemented as the server 1000, the processor 120 may receive the information associated with the first audio from a first device 1020 through the communication interface 110, and receive the information associated with the alarm from a second device 1030. Alternatively, the processor 120 according to an example may also transmit the play request signal associated with the first audio to the first device 1020 through the communication interface 110.

Referring to FIG. 10, when the information associated with the first audio included with the play start signal of the first audio is received from the first device 1020 according to one or more embodiments, the processor 120 may transmit the first audio data for outputting the first audio to a speaker 1010 through the communication interface 110.

According to one or more embodiments, when the alarm stop signal is received during the first time interval from the time point at which the first audio is output, the processor 120 may transmit a control signal for ending the output of the alarm to the speaker 1010 through the communication interface 110. The speaker 1010 according to an example may be a speaker with a Bluetooth function, but is not limited thereto.

According to one or more embodiments, based on the electronic apparatus 100 being implemented as the server 1000, the server 1000 may identify whether the alarm stop signal is received during the first time interval from the time point at which the first audio is output. According to an example, based on the electronic apparatus 100 being implemented as the server 1000, the processor 120 may receive the history information corresponding to the second device 1030, and identify the duration of the first time interval based therefrom.

According to one or more embodiments, the electronic apparatus 100 and a plurality of devices 1010 to 1030 may be implemented as an Internet of Things (IoT) system. Based on the electronic apparatus 100 and the plurality of devices 1010 to 1030 being implemented as the IoT system, the electronic apparatus 100 and the plurality of devices 1010 to 1030 may perform communication between each of the terminal devices.

The electronic apparatus 100 according to one or more embodiments may be implemented as not only a speaker and a server, but also as a user terminal capable of outputting sound such as a smartphone.

Figure 11:
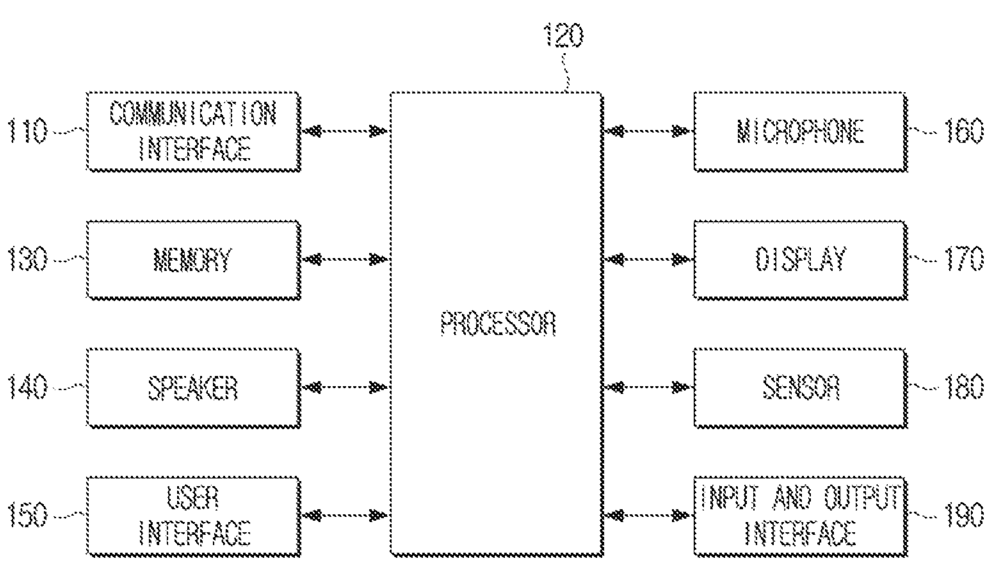
FIG. 11 is a block diagram illustrating a detailed configuration of an electronic apparatus according to one or more embodiments.

FIG. 11 is a block diagram illustrating a detailed configuration of an electronic apparatus according to one or more embodiments.

Referring to FIG. 11, an electronic apparatus 100' according to one or more embodiments may include the communication interface 110, the processor 120, a memory 130, a speaker 140, a user interface 150, a microphone 160, a display 170, a sensor 180, and an input and output interface 190. Detailed descriptions of configurations that overlap with the configurations shown in FIG. 2 from among the configurations shown in FIG. 11 will be omitted.

The memory 130 may store data necessary for the various embodiments. The memory 130 may be implemented in a form of a memory embedded in the electronic apparatus 100' according to a data storage use, or in the form of the memory attachable to and detachable from the electronic apparatus 100'. For example, the data for the driving of the electronic apparatus 100' may be stored in the memory embedded to the electronic apparatus 100', and data for an expansion function of the electronic apparatus 100' may be stored in a memory attachable to and detachable from the electronic apparatus 100'. The memory embedded in the electronic apparatus 100' may be implemented as at least one from among a volatile memory (e.g., a dynamic random access memory (DRAM), a static RAM (SRAM), or a synchronous dynamic RAM (SDRAM), etc.), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash, etc.), a hard drive or a solid state drive (SSD)). In the case of the memory attachable to and detachable from the electronic apparatus 100', the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., a universal serial bus (USB) memory) connectable to a USB port, or the like.

The speaker 140 may be formed of a tweeter for playing a high-range sound, a mid-range for playing a mid-range sound, a woofer for playing a low-range sound, a subwoofer for playing extremely low-range sound, an enclosure for controlling resonance, a crossover network that divides electric signal frequencies input to the speaker by frequency bands, and the like.

The speaker 140 may output a sound signal to an outside of the electronic apparatus 100'. The speaker 140 may output the playing of multimedia, the playing of recordings, various notification sounds, voice messages, and the like. The electronic apparatus 100' may include an audio output device such as the speaker 140, but may include an output device such as an audio output terminal. Specifically, the speaker 140 may provide obtained information, information manufactured and produced based on the obtained information, a response result or an operation result associated with a user voice, and the like in voice form.

The user interface 150 may be implemented with a device such as a button, a touch pad, a mouse and a keyboard, or implemented as a touch screen, a remote controller transceiver, and the like, capable of performing the above-described display function or an operation input function together therewith. The remote controller transceiver may receive a remote controller signal from an external remote control device through at least one communication method from among an infrared communication, a Bluetooth communication, or a Wi-Fi communication, or transmit the remote controller signal.

The microphone 160 may refer to a module that obtains sound and converts to electric signals, and may be a condenser microphone, a ribbon microphone, a moving-coil microphone, a piezoelectric device microphone, a carbon microphone, or a Micro Electro Mechanical System (MEMS) microphone. In addition, the above may be implemented in an omnidirectional, a bidirectional, a unidirectional, a Sub Cardioid, a Super Cardioid, a Hyper Cardioid method.

Various embodiments in which the electronic apparatus 100' performs an operation corresponding to a user voice signal received through the microphone 160 may be provided.

In an example, the electronic apparatus 100' may control the display 170 based on the user voice signal received through the microphone 160. For example, if the user voice signal for displaying content A is received, the electronic apparatus 100' may control the display 170 to display content A.

In another example, the electronic apparatus 100' may control an external display device connected with the electronic apparatus 100' based on the user voice signal received through the microphone 160. Specifically, the electronic apparatus 100' may generate a control signal for controlling the external display device for an operation corresponding to the user voice signal to be performed in the external display device, and transmit the generated control signal to the external display device. Here, the electronic apparatus 100' may store a remote control application for controlling the external display device. Then, the electronic apparatus 100' may transmit the generated control signal to the external display device using at least one communication method from among the Bluetooth, Wi-Fi, or infrared method. For example, if the user voice signal for displaying content A is received, the electronic apparatus 100' may transmit the control signal for controlling for content A to be displayed in the external display device to the external display device. Here, the electronic apparatus 100' may refer to various terminal devices which can be installed with the remote control application such as a smartphone, an artificial intelligence (AI) speaker, and the like.

In another example, the electronic apparatus 100' may use the remote control device to control the external display device connected with the electronic apparatus 100' based on the user voice signal received through the microphone 160. Specifically, the electronic apparatus 100' may transmit the control signal for controlling the external display device to the remote control device for the operation corresponding to the user voice signal to be performed in the external display device. Then, the remote control device may transmit the control signal received from the electronic apparatus 100' to the external display device. For example, if the user voice signal for displaying content A is received, the electronic apparatus 100' may transmit the control signal for controlling for content A to be displayed in the external display device to the remote control device, and the remote control device may transmit the received control signal to the external display device.

According to one or more embodiments, the electronic apparatus 100' may include the display 170. Specifically, the electronic apparatus 100' may directly display an obtained image or content in the display 170.

According to other embodiments, the electronic apparatus 100' may not include the display 170. The electronic apparatus 100' may be connected with the external display device, and may transmit images or content stored in the electronic apparatus 100' to the external display device. Specifically, the electronic apparatus 100' may transmit the images or content together with the control signal for controlling for the images or content to be displayed in the external display device to the external display device. Here, the external display device may be connected with the electronic apparatus 100' through the communication interface 110 or an input and output interface 190. For example, the electronic apparatus 100' may not include a display such as a set top box (STB). In addition, the electronic apparatus 100' may only include a small-scale display that can display only simple information such as text information. Here, the electronic apparatus 100' may transmit an image or content to the external display device by wired or wireless means through the communication interface 110, or transmit to the external display device through the input and output interface 190.

The display 170 may be implemented as a display including an emissive device or a display including a non-emissive device and a backlight. For example, the display 170 may be implemented as a display of various types such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diode (QLED), or the like. In the display 170, a driving circuit, which may be implemented in the form of an a-si TFT, a low temperature poly silicon (LTPS) TFT, an organic TFT (OTFT), or the like, a backlight unit, and the like may be included.

The display 170 may be implemented as a touch screen coupled with a touch sensor, a flexible display, a rollable display, a three-dimensional display (3D display), a display physically coupled with a plurality of display modules, or the like. The processor 120 may control the display 170 to output an output image obtained according to the above-described various embodiments. Here, the output image may be a high-resolution image of 4K or greater than or equal to 8K.

The sensor 180 may include a plurality of sensors of various types. The sensor 180 may measure physical quantity or sense an operating state of the electronic apparatus 100', and convert the measured or sensed information to an electric signal. The sensor 180 may include a camera, and the camera may include a lens focusing on visible light and other optical signals which are received by being reflected by an object with an image sensor and an image sensor which can sense the visible light and other optical signals. Here, the image sensor may include a 2-dimensional (2D)

pixel array divided into a plurality of pixels. The camera according to an example may be implemented as a depth camera.

The input and output interface 190 may be any one interface from among a High Definition Multimedia Interface (HDMI), a Mobile High-Definition Link (MHL), a Universal Serial Bus (USB), a Display Port (DP), a Thunderbolt, a Video Graphics Array (VGA) port, a RGB port, a D-subminiature (D-SUB), and a Digital Visual Interface (DVI). The input and output interface 190 may input and output at least one from among an audio signal and a video signal. According to one or more embodiments, the input and output interface 190 may include a port that inputs and outputs only the audio signal and a port which inputs and outputs only the video signal as separate ports, or may be implemented as one port which inputs and outputs both the audio signal and the video signal. The electronic apparatus 100' may transmit at least one from among the audio signal and the video signal to the external device (e.g., external display device or external speaker) through the input and output interface 190. Specifically, an output port included in the input and output interface 190 may be connected with the external device, and the electronic apparatus 100' may transmit at least one from among the audio signal and the video signal to the external device through the output port.

According to the various embodiments described above, when the audio data associated with the alarm is received from the second device while the audio is being output based on the data received from the first device, the audio that was being played previously may be made to be output again when the output of the alarm is ended, and thereby the usability of the electronic apparatus may be increased. Accordingly, user satisfaction may be enhanced.

Methods according to the various embodiments of the disclosure described above may be implemented in a form of an application installable in the electronic apparatus of the related art. Alternatively, the methods according to the various embodiments of the disclosure described above may be performed using a deep learning-based trained neural network (or, a deep trained neural network), that is a learning network model. In addition, the methods according to the various embodiments of the disclosure described above may be implemented with only a software upgrade associated with the electronic apparatus of the related art, or with only a hardware upgrade. In addition, the various embodiments of the disclosure described above may be performed through an embedded server provided in the electronic apparatus or through the external server of the electronic apparatus.

According to one or more embodiments of the disclosure, the various embodiments described above may be implemented with software including instructions stored in a machine-readable storage media (e.g., computer). The machine may call an instruction stored in the storage medium, and as a device operable according to the called instruction, may include a display device (e.g., display device (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, "non-transitory" merely means that the storage medium is tangible and does not include a signal, and the term does not differentiate data being semi-permanently stored or being temporarily stored in the storage medium. For example, the 'non-transitory storage medium' may include a buffer in which data is temporarily stored.

In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity and perform the same or similar functions performed by the respective corresponding elements prior to integration. Operations performed by a module, a program, or another element, in accordance with various embodiments, may be executed sequentially, in a parallel, repetitively, or in a heuristic manner, or at least some operations may be executed in a different order, omitted or another operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:

a communication interface;

memory storing instructions; and at least one processor, wherein the instructions, when executed by the at least one processor, cause the electronic apparatus to:

based on first audio data and a first play start signal corresponding to the first audio data being received from a first device through the communication interface, cause the first audio data to be output, based on second audio data and a second play start signal corresponding to the second audio data being received from a second device through the communication interface while the first audio data is being output, cause the output of the first audio data to stop and cause the second audio data to be output, based on the output of the second audio data ending, transmit a signal requesting playing of the first audio data to the first device through the communication interface, based on a second first play start signal being received through the communication interface subsequent to the transmitting of the signal requesting playing of the first audio data, cause the first audio data to be output, based on a play stop signal corresponding to the second audio data being received from the second device through the communication interface within a first time from when the output of the second audio data is started, cause the output of the second audio data to stop, based on the second play start signal and the second audio data being received from the second device through the communication interface, identify whether the second audio data is an alarm type based on at least one from among the second audio data or history information corresponding to the second device, based on the second audio data being identified as the alarm type, identify whether the play stop signal is received from the second device through the communication interface during the first time, and based on identifying that the play stop signal was received during the first time, transmit the signal requesting the playing of the first audio data to the first device through the communication interface.

2. The electronic apparatus of claim 1, wherein the memory further stores at least one from among history information corresponding to a device or audio duration time information corresponding to a plurality of application types, and wherein the instructions, when executed by the at least one processor, further cause the electronic apparatus to:

based on the play stop signal being received through the communication interface during the first time and based on at least one from among the history information or the audio duration time information, cause the output of the second audio data to stop and transmit the signal requesting the playing of the first audio data to the first device through the communication interface.

3. The electronic apparatus of claim 2, wherein the instructions, when executed by the at least one processor, further cause the electronic apparatus to:

identify, based on the second play start signal being received from the second device through the communication interface while the first audio data is being output, type information of an application from among the plurality of application types corresponding to the second audio data, and identify, based on the identified type information of the application and the -audio duration time information, a duration of the first time.

4. The electronic apparatus of claim 1, further comprising: a user interface, wherein the instructions, when executed by the at least one processor, further cause the electronic apparatus to:

identify, based on a user input received through the user interface, a duration of the first time.

5. The electronic apparatus of claim 1, wherein the memory further stores a trained neural network model, and wherein the instructions, when executed by the at least one processor, is further cause the electronic apparatus to:

identify whether the second audio data is the alarm type by inputting the second audio data into the trained neural network model.

6. The electronic apparatus of claim 1, wherein the instructions, when executed by the at least one processor, is further cause the electronic apparatus to:

based on receiving, through the communication interface, a signal corresponding to a same type as the second play start signal a number of times that is greater than or equal to a pre-set number of times during a time interval from when the second play start signal is received from the second device, cause the output of the second audio data to stop.

7. The electronic apparatus of claim 1, further comprising: an outputter, wherein the instructions, when executed by the at least one processor, further cause the electronic apparatus to:

based on the first play start signal being received from the first device through the communication interface, output the first audio data through the outputter, based on the second play start signal being the alarm type and being received from the second device through the communication interface while the first audio data is being output, output the second audio data through the outputter, and based on the second first play start signal being received through the communication interface in response to the signal requesting playing of the first audio data, output the first audio data through the outputter.

8. The electronic apparatus of claim 1, wherein the instructions, when executed by the at least one processor, further cause the electronic apparatus to:

based on the first play start signal being received through the communication interface in response to the signal requesting playing of the first audio data, cause the first audio data to be output from a second play time point in the first audio data that precedes, by a pre-set time interval, a first play time point corresponding to a play time point in the first audio data when the output of the first audio data was stopped.

9. A method of controlling an electronic apparatus, the method comprising:

based on first audio data and a first play start signal corresponding to the first audio data being received from a first device, outputting the first audio data;

based on second audio data and a second play start signal corresponding to the second audio data being received from a second device while the first audio data is being output, stopping the outputting of the first audio data and outputting the second audio data;

based on the outputting of the second audio data ending, transmitting a signal requesting playing of the first audio data to the first device; and based on the first play start signal being received subsequent to the transmitting of the signal requesting the playing of the first audio data, outputting the first audio data, wherein the transmitting the signal requesting the playing of the first audio data comprises:

based on a play stop signal corresponding to the second audio data being received from the second device within a first time from when the output of the second audio data is started, ending the outputting of the second audio data, and wherein the method further comprises:

based on the second play start signal and the second audio data being received from the second device, identifying whether the second audio data is an alarm type based on at least one from among the second audio data or history information corresponding to the second device;

based on the second audio data being identified as the alarm type, identifying whether the play stop signal is received from the second device during the first time; and based on identifying that the play stop signal was received during the first time, transmitting the signal requesting the playing of the first audio data to the first device.

10. The method of claim 9, wherein the transmitting the signal requesting the playing of the first audio data further comprises:

based on the play stop signal being received from the second device during the first time and based on at least one from among history information corresponding to a device stored in a memory of the electronic apparatus or audio duration time information corresponding to a plurality of application types stored in the memory, stopping the outputting of the second audio data and transmitting the signal requesting the playing of the first audio data to the first device.

11. The method of claim 10, further comprising:

identifying, based on the second play start signal being received from the second device while the first audio data is being output, type information of an application from among the plurality of application types corresponding to the second audio data; and identifying, based on the identified type information of the application and the audio duration time information, a duration of the first time.

12. The method of claim 9, further comprising:

based on the first play start signal being received in response to the signal requesting playing of the first audio data, causing the first audio data to be output from a second play time point in the first audio data that precedes, by a pre-set time interval, a first play time point corresponding to a play time point in the first audio data when the output of the first audio data was stopped.

13. A non-transitory computer-readable recording medium having instructions stored therein, which when executed by at least one processor cause the at least one processor to execute a method of controlling an electronic apparatus, the method comprising:

based on first audio data and a first play start signal corresponding to the first audio data being received from a first device, outputting the first audio data;

based on second audio data and a second play start signal corresponding to the second audio data being received from a second device while the first audio data is being output, stopping the outputting of the first audio data and outputting the second audio data;

based on the outputting of the second audio data ending, transmitting a signal requesting playing of the first audio data to the first device; and based on the first play start signal being received subsequent to the transmitting of the signal requesting the playing of the first audio data, outputting the first audio data, wherein the transmitting the signal requesting the playing of the first audio data comprises:

based on a play stop signal corresponding to the second audio data being received from the second device within a first time from when the output of the second audio data is started, ending the outputting of the second audio data, and wherein the method further comprises:

based on the second play start signal and the second audio data being received from the second device, identifying whether the second audio data is an alarm type based on at least one from among the second audio data or history information corresponding to the second device;

based on the second audio data being identified as the alarm type, identifying whether the play stop signal is received from the second device during the first time; and based on identifying that the play stop signal was received during the first time, transmitting the signal requesting the playing of the first audio data to the first device.

14. The non-transitory computer-readable recording medium of claim 13, wherein the transmitting the signal requesting the playing of the first audio data further comprises:

based on the play stop signal being received from the second device during the first time and based on at least one from among history information corresponding to a device stored in a memory of the electronic apparatus or audio duration time information corresponding to a plurality of application types stored in the memory, stopping the outputting of the second audio data and transmitting the signal requesting the playing of the first audio data to the first device.

15. The non-transitory computer-readable recording medium of claim 14, wherein the method further comprises:

identifying, based on the second play start signal being received from the second device while the first audio data is being output, type information of an application from among the plurality of application types corresponding to the second audio data; and identifying, based on the identified type information of the application and the audio duration time information, a duration of the first time.

* * * * *